US008161922B2

(12) United States Patent
Watanabe et al.

(10) Patent No.: US 8,161,922 B2
(45) Date of Patent: Apr. 24, 2012

(54) LINK TYPE VARIABLE STROKE ENGINE

(75) Inventors: Sei Watanabe, Wako (JP); Shohei Kono, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 458 days.

(21) Appl. No.: 12/464,464

(22) Filed: May 12, 2009

(65) Prior Publication Data
US 2009/0283073 A1 Nov. 19, 2009

(30) Foreign Application Priority Data

May 13, 2008 (JP) ................................. 2008-126208

(51) Int. Cl.
F02B 75/04 (2006.01)
(52) U.S. Cl. .................... 123/48 B; 123/48 A; 123/78 E; 123/78 F; 123/197.3; 123/197.4
(58) Field of Classification Search ................ 123/48 A, 123/48 AA, 48 B, 48 R, 78 A, 78 R, 78 B, 123/78 BA, 78 E, 197.1, 197.2, 197.3, 197.4
See application file for complete search history.

(56) References Cited

U.S. PATENT DOCUMENTS

| 4,422,414 | A | * | 12/1983 | Moeller | 123/48 B |
|---|---|---|---|---|---|
| 4,517,931 | A | * | 5/1985 | Nelson | 123/48 B |
| 4,974,554 | A | * | 12/1990 | Emery | 123/48 B |
| 6,167,851 | B1 | * | 1/2001 | Bowling | 123/48 B |
| 6,510,821 | B2 | * | 1/2003 | Fujimoto et al. | 123/48 B |
| 7,185,615 | B2 | * | 3/2007 | Sato et al. | 123/48 B |
| 7,357,111 | B2 | * | 4/2008 | Maezuru et al. | 123/196 R |
| 2002/0020368 | A1 | * | 2/2002 | Fujimoto et al. | 123/48 B |
| 2002/0043228 | A1 | * | 4/2002 | Moteki | 123/78 E |
| 2006/0081211 | A1 | * | 4/2006 | Genter | 123/197.3 |
| 2009/0000598 | A1 | | 1/2009 | Bach et al. | |

FOREIGN PATENT DOCUMENTS

| EP | 1347159 A2 | 9/2003 |
|---|---|---|
| EP | 1426585 A1 | 6/2004 |
| JP | 2000-073804 A | 3/2000 |
| WO | 2007/057149 A1 | 5/2007 |

OTHER PUBLICATIONS

European Search Report dated Jul. 30, 2009, issued in corresponding European Patent Application No. 09160109.

* cited by examiner

Primary Examiner — Noah Kamen
Assistant Examiner — Long T Tran
(74) Attorney, Agent, or Firm — Westerman, Hattori, Daniels & Adrian, LLP

(57) ABSTRACT

In a link type variable stroke engine in which a piston, a crankshaft and an eccentric shaft are linked by a linking mechanism, counterweights are provided on the crankshaft so that in a projection view on a plane orthogonal to a rotation axis of the crankshaft, centers of gravity of the counterweights are located on a straight line extending from the rotation axis of the crankshaft in an opposite direction to a direction of a total inertial exciting force when the total inertial exciting force becomes maximum, the total inertial exciting force being obtained by adding inertial exciting forces occurring respectively in movable components of the linking mechanism. Accordingly, it is possible to effectively suppress and lessen inertial exciting force.

1 Claim, 4 Drawing Sheets

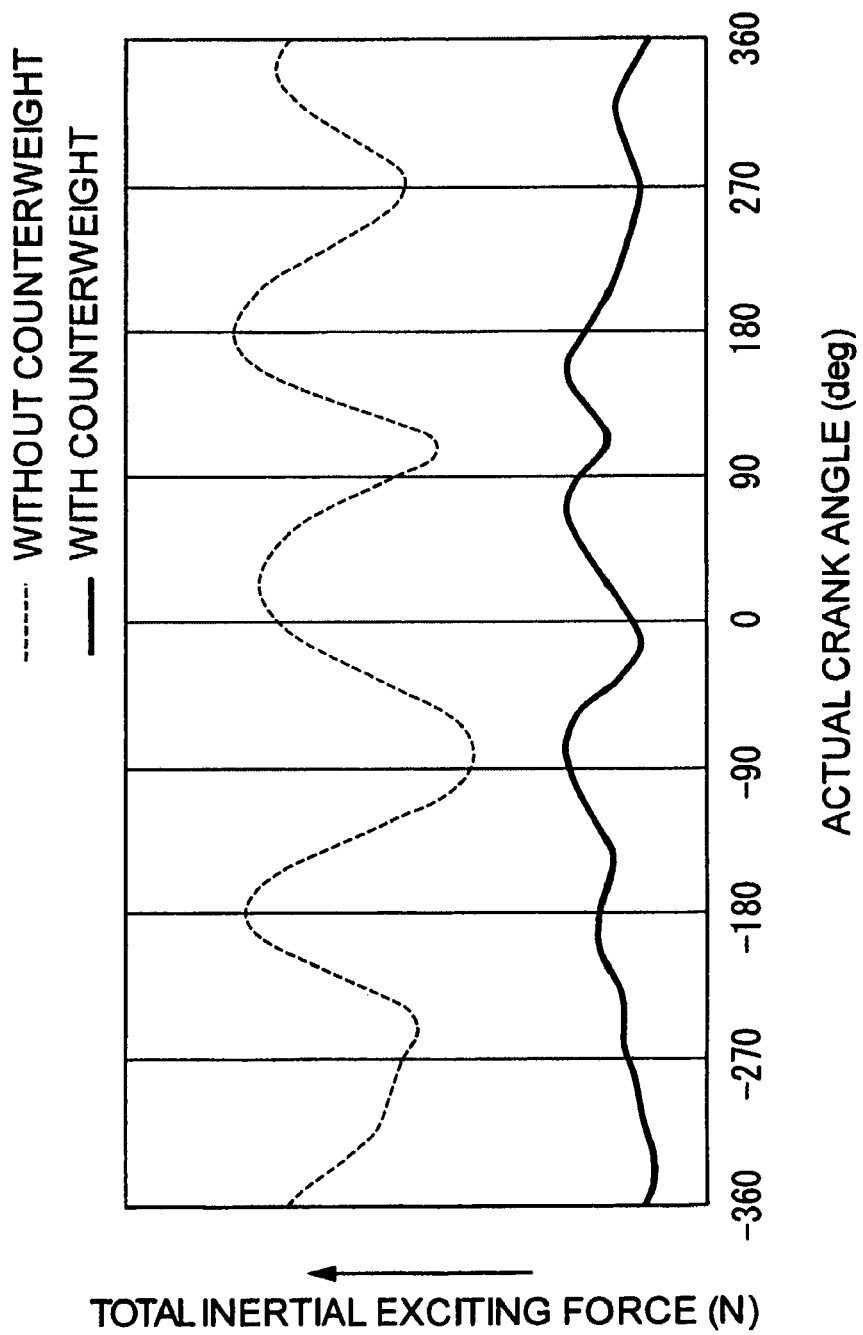

LINK TYPE VARIABLE STROKE ENGINE

BACKGROUND OF THE INVENTION

1. Field of the Invention

The present invention relates to a link type variable stroke engine, and especially relates to a link type variable stroke engine in which, in a crankcase of an engine main body, a crankshaft is rotatably supported, and a rotary shaft is rotatably supported so that power reduced at a speed reduction ratio of ½ from the crankshaft is transmitted thereto, the rotary shaft having an axis parallel with the crankshaft and being provided with an eccentric shaft at an eccentric position, and a piston, slidably fitted to a cylinder block of the engine main body, the crankshaft and the eccentric shaft are linked by a linking mechanism, the linking mechanism including: a main connecting rod coupled, at one end, with the piston by using a piston pin; a sub connecting rod rotatably coupled with a crank pin of the crankshaft and rotatably coupled with the other end of the main connecting rod; and a swing rod rotatably coupled, at one end, with the sub connecting rod at a position displaced from a position coupled with the main connecting rod and rotatably coupled, at the other end, with the eccentric shaft.

2. Description of the Related Art

In a conventional reciprocating engine, inertial exciting force, which induces inertial vibration, occurs at two parts: a reciprocating part including a piston and a small end of a connecting rod; and a rotating part including a crank pin and a big end of the connecting rod. To suppress and lessen the exciting force, counterweights are generally provided on a crankshaft so that centers of gravity of the counterweights are located on the opposite side of the axis of the crankshaft from the crank pin and on a straight line connecting the axis of the crankshaft and the axis of the crank pin.

Meanwhile, a link type variable stroke engine has already been known by Japanese Patent Application Laid-open No. 2000-73804 and the like. In the link type variable stroke engine, a piston, a crankshaft and an eccentric shaft are linked by a linking mechanism, the eccentric shaft provided to a rotary shaft which is parallel with the crankshaft and to which power reduced at a speed reduction ratio of ½ from the crankshaft is transmitted. Even in such a link type variable stroke engine, inertial exciting force needs to be suppressed and lessened.

In the link type variable stroke engine, inertial exciting force occurs due to a lumped mass near a connecting rod pin rotatably connecting a sub connecting rod with a main connecting rod, a lumped mass near a swing pin connecting the sub connecting rod with a swing rod and a lumped mass near the eccentric shaft, besides the inertial exciting force occurring due to the mass of a reciprocating part, which is the mass of the entire piston and a one-end-side part of the main connecting rod, and the mass of a rotating part, which is the mass of a crank pin and the mass of a part of the sub connecting rod near the crank pin. Accordingly, the inertial exciting force unique to the link type variable stroke engine cannot be effectively reduced with the same configuration as that of the reciprocating engine, that is, the configuration in which counterweights, are provided so that centers of gravity of the counterweights are located on the opposite side of the axis of the crankshaft from the crank pin and on a straight line connecting the axis of the crankshaft and the axis of the crank pin as shown in Japanese Patent Application Laid-open No. 2000-73804.

For this reason, when the inertial exciting force becomes excessively large and consequently the inertial vibration becomes large, a worker using an apparatus equipped with the link type variable stroke engine, for example, a working machine, feels uncomfortable, the working machine starts to move by itself and thereby grounding performance is deteriorated, and noise attributable to vibration increases, for example. Moreover, an excessive increase in the inertial exciting force may also cause a reduction in the strength of components of the engine.

SUMMARY OF THE INVENTION

The present invention has been made in view of the above-described circumstances. An object of the present invention is to provide a link type variable stroke engine capable of effectively suppressing and lessening inertial exciting force.

In order to achieve the object, according to a feature of the present invention, there is provided a link type variable stroke engine in which, in a crankcase of an engine main body, a crankshaft is rotatably supported, and a rotary shaft is rotatably supported so that power reduced at a speed reduction ratio of ½ from the crankshaft is transmitted thereto, the rotary shaft having an axis parallel with the crankshaft and being provided with an eccentric shaft at an eccentric position, and a piston, slidably fitted to a cylinder block of the engine main body, the crankshaft and the eccentric shaft are linked by a linking mechanism, the linking mechanism including: a main connecting rod coupled, at one end, with the piston by using a piston pin; a sub connecting rod rotatably coupled with a crank pin of the crankshaft and rotatably coupled with the other end of the main connecting rod by using a connecting rod pin; and a swing rod rotatably coupled, at one end, with the sub connecting rod by using a swing pin at a position displaced from a position coupled with the main connecting rod and rotatably coupled, at the other end, with the eccentric shaft, wherein counterweights are provided on the crankshaft so that in a projection view on a plane orthogonal to a rotation axis of the crankshaft, centers of gravity of the counterweights are located on a straight line extending from the rotation axis of the crankshaft in an opposite direction to a direction of a total inertial exciting force when the total inertial exciting force becomes maximum, the total inertial exciting force being obtained by adding inertial exciting forces occurring respectively in movable components of the linking mechanism.

According to the above-described configuration of the present invention, the counterweights are provided on the crankshaft so that in a projection view on a plane orthogonal to the rotation axis of the crankshaft, centers of gravity of the counterweights are located on a straight line extending from the rotation axis of the crankshaft in the direction opposite to the direction of the total inertial exciting force when the total inertial exciting force becomes maximum. Accordingly, the centrifugal force occurring at the centers of gravity of the counterweights acts in such a direction that the total inertial exciting force occurring with movement of each movable component of the linking mechanism would be reduced. Thereby, the total inertial exciting force can be suppressed and lessened effectively, consequently reducing vibration and also suppressing noise attributable to vibration and a reduction in the strength of each component of the engine.

The above description, other objects, characteristics and advantages of the present invention will be clear from detailed descriptions which will be provided for the preferred embodiment referring to the attached drawings.

BRIEF DESCRIPTION OF THE DRAWINGS

FIG. 1 to FIG. 4 show an embodiment of the present invention:

FIG. 1 is a longitudinal cross-sectional side view of an engine;

FIG. 2 is a cross-sectional view taken along a line 2-2 in FIG. 1;

FIG. 3 is a view showing a direction of inertial exciting force of each movable part of a linking mechanism in a state where total inertial exciting force is the maximum; and FIG. 4 is a graph showing changes in the total inertial exciting force in accordance with rotation of a crankshaft.

DESCRIPTION OF THE PREFERRED EMBODIMENT

An embodiment of the present invention will be explained below based on FIG. 1 to FIG. 4.

Figure 1:
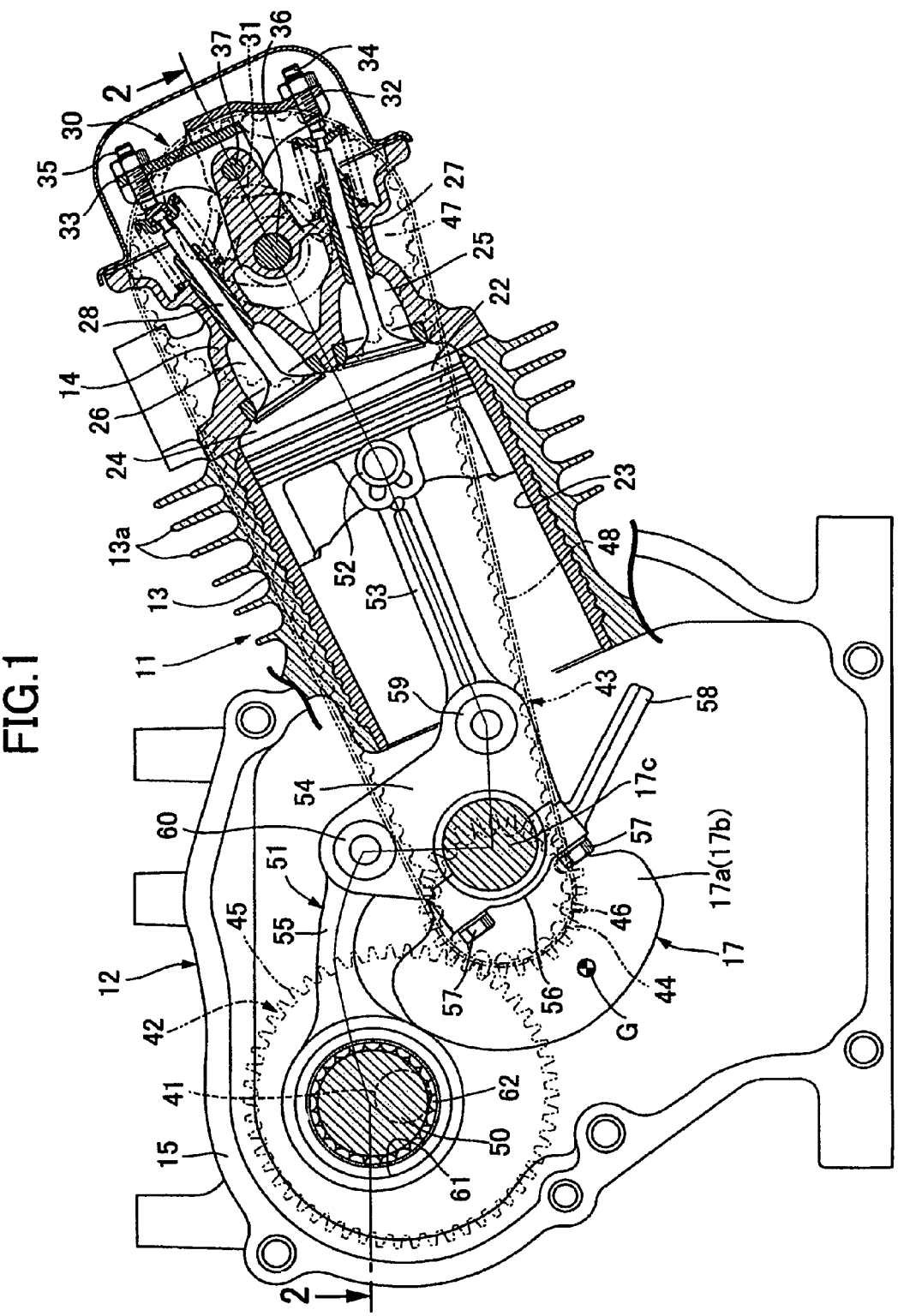
Figure 2:
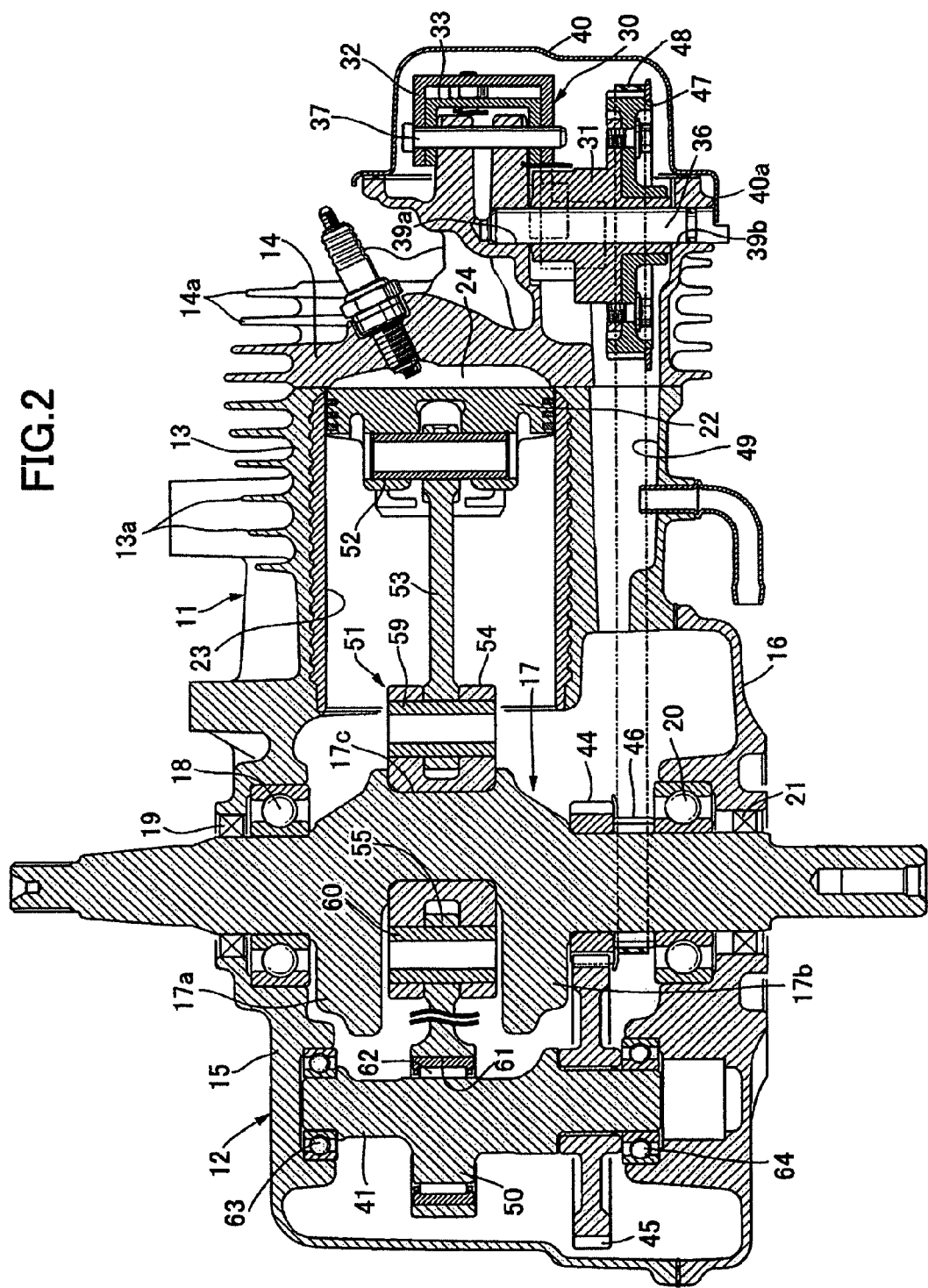

First, in FIG. 1 and FIG. 2, this link type variable stroke engine is an air-cooled single cylinder engine, which is used for working machines and the like, for example. An engine body 11 includes: a crankcase 12; a cylinder block 13 protruding in upwardly tilting manner from one side surface of the crankcase 12; and a cylinder head 14 joined to a head portion of the cylinder block 13. A large number of air-cooling fins 13a and 14a are provided on outer side surfaces of the cylinder block 13 and the cylinder head 14.

The crankcase 12 comprises: a case main body 15 formed integrally with the cylinder block 13 by molding and opened at one side; and a side cover 16 joined to the opened end of the case main body 15. A crankshaft 17 is rotatably supported in the crankcase 12. The crankshaft 17 integrally has a pair of counterweights 17a and 17b, as well as a crank pin 17c which connects between the counter weights 17a and 17b. Accordingly, both end portions of the crankshaft 17 rotatably penetrate the case main body 15 and the side cover 16 of the crankcase 12 and protrude outwardly. A ball bearing 18 and an annular sealing member 19 are disposed between the crankshaft 17 and the case main body 15, the sealing member 19 disposed on the outer side of the ball bearing 18, and a ball bearing 20 and an annular sealing member 21 are disposed between the crankshaft 17 and the side cover 16, the sealing member 21 disposed on the outer side of the ball bearing 20.

A cylinder bore 23 is formed in the cylinder block 13. A piston 22 is slidably fitted in the cylinder bore 23. A combustion chamber 24 is formed between the cylinder block 13 and the cylinder head 14, and a top portion of the piston 22 faces the combustion chamber 24. An intake port 25 and an exhaust port 26, both communicating with the combustion chamber 24, are formed in the cylinder head 14. In addition, an intake valve 27 for opening and closing the passage between the intake port 25 and the combustion chamber 24 as well as an exhaust valve 28 for opening and closing the passage between the exhaust port 26 and the combustion chamber 24 are disposed in the cylinder head 14 so as to be capable of performing the opening and closing operations.

A valve operating mechanism 30 opening and closing the intake valve 27 and the exhaust valve 28 includes: a valve operating cam 31 rotated by the crankshaft 17 at a speed reduction ratio of ½; and intake-side and exhaust-side rocker arms 32 and 33 which are each, at one end, in sliding contact with the valve operating cam 31 while tappet screws 34 and 35 are threaded respectively into the other ends of the rocker arms 32 and 33 so that the forward/backward movement positions thereof can be adjusted, the tappet screws 32 and 33 being abutted against upper end portions of the intake valve 27 and the exhaust valve 28, respectively. The valve operating cam 31 is rotatably supported by a first spindle 36 which has an axis parallel with the crankshaft 17 and which is fixedly supported at the cylinder head 14, and the intake-side and exhaust-side rocker arms 32 and 33 are swingably supported by a second spindle 37 which has an axis parallel with the first spindle 36 and which is supported at the cylinder head 14.

In the cylinder head 14, fitting holes 39a and 39b for the first spindle 36 to be fitted therein are formed with a space therebetween so as to have the same axis, and the fitting hole 39b is formed so as to be opened at one side surface of the cylinder head 14. The valve operating mechanism 30 is covered with a head cover 40. The head cover 40 includes an engagement portion 40a which is engaged with a protruding end of the first spindle 36 protruding from the fitting hole 39b, so as to prevent the first spindle 36 from coming out of the fitting hole 39b and rotating about the axis. The head cover 40 is joined to the cylinder head 14.

Opposite end portions of a rotary shaft 41 are rotatably supported at the case main body 15 and the side cover 16 of the crankcase 12 with ball bearings 63 and 64, respectively, the rotary shaft 41 having an axis parallel with the crankshaft 17 while having a rotation axis above a rotation axis of the crankshaft 17. Between the rotary shaft 41 and the crankshaft 17, first timing transmitting means 42 is disposed which reduces the rotation power of the crankshaft 17 at a speed reduction ratio of ½ and then transmits the rotation power to the rotary shaft 41. Further, between the valve operating cam 31 of the valve operating mechanism 30 and the crankshaft 17, second timing transmitting means 43 is disposed which reduces the rotation power of the crankshaft 17 at a speed reduction ratio of ½ and then transmits the rotation power to the valve operating cam 31.

Here, the first and second timing transmitting means 42 and 43 are disposed between the side cover 16 and the counterweight 17b of the pair of counterweights 17a and 17b of the crankshaft 17, to be adjacent to each other in an axial direction of the crankshaft 17.

The first timing transmitting means 42 includes: a driving gear 44 fixed to the crankshaft 17; and a driven gear 45 coupled with the rotary shaft 41 so that relative rotation therebetween would not be possible and the driven gear 45 would mesh with the driving gear 44. The second timing transmitting means 43 includes: a driving sprocket 46 provided integrally with the crankshaft 17; a driven sprocket 47 fixedly attached to the valve operating cam 31; and a timing belt 48 wound around the driving sprocket 46 and the driven sprocket 47. In the cylinder block 13 and the cylinder head 14, a timing belt chamber 49 in which the timing belt 48 travels is formed.

An eccentric shaft 50 is provided integrally with the rotary shaft 41 at a position corresponding to a portion between the pair of counterweights 17a and 17b of the crankshaft 17. The eccentric shaft 50 has its axis at a position eccentric with respect to the axis of the rotary shaft 41. The eccentric shaft 50, the piston 22 and the crankshaft 17 are linked by a linking mechanism 51.

The linking mechanism 51 comprises: a main connecting rod 53 coupled, at one end, with the piston 22 by using a piston pin 52; a sub connecting rod 54 disposed between the counterweights 17a and 17b of the crankshaft 17 to be coupled with the crank pin 17c and to be rotatably coupled with the other end of the main connecting rod 53; and a swing rod 55 rotatably connected, at one end, with the sub connecting rod 54 at a position displaced from the coupled position of the main connecting rod 53, and rotatably coupled, at the other end, with the eccentric shaft 50.

The sub connecting rod 54 is formed so as to be in sliding contact with half of the circumference of the crank pin 17c. A crank cap 56 is disposed to be in sliding contact with the other half of the circumference of the crank pin 17c, and is fastened to the sub connecting rod 54 with a pair of bolts 57 and 57. The crank cap 56 is provided with an oil dipper 58 for dipping up oil stored in the crankcase 12.

The other end portion of the main connecting rod 53 is rotatably coupled with the one end portion of the sub connecting rod 54 by using a connecting rod pin 59. The one end portion of the swing rod 55 is rotatably coupled with the sub connecting rod 54 by using a swing pin 60. A circular shaft hole 61, which the eccentric shaft 50 penetrates, is formed in the other end portion of the swing rod 55, and a needle bearing 62 is provided between the swing rod 55 and the eccentric shaft 50.

When the rotary shaft 41 is rotated at a speed reduction ratio of ½ along with rotation of the crankshaft 17 and the eccentric shaft 50 thereby rotates about the rotation axis of the rotary shaft 41, the linking mechanism 51 operates, for example, in a manner that the stroke of the piston 22 in the expansion stroke becomes larger than that in the compression stroke. Thus, a higher expansion work is achieved with the same amount of intake of the air-fuel mixture, so that the cycle thermal efficiency can be improved.

Figure 3:
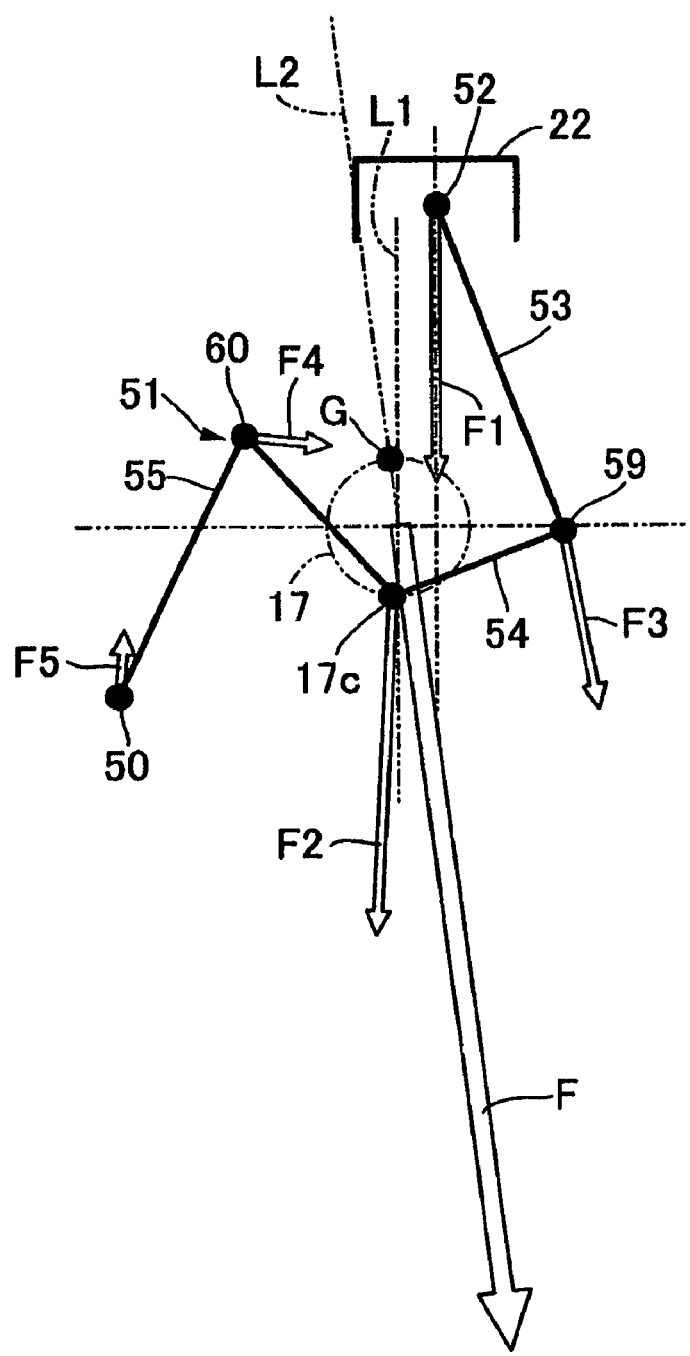

In the linking mechanism 51 of the link type variable stroke engine having the above-described configuration, as shown in FIG. 3, inertial exciting forces F1 to F5 occur respectively in the movable components of the linking mechanism 51. Specifically, the following inertial exciting forces occur in the movable components of the linking mechanism 51: the inertial exciting force F1 due to a mass Mrec of the reciprocating part obtained by adding the mass of the entire piston 22 including a piston ring, a clip and the like, and the piston pin 52, and the mass of a part of the main connecting rod 53 on the piston pin 52 side; the inertial exciting force F2 due to a mass Mrot of the rotating part obtained by adding the mass of the crank pin 17c and the mass of a part of the sub connecting rod 54 near the crank pin 17c; the inertial exciting force F3 due to a mass Mcp of the connecting rod pin part obtained by adding the mass of a part of the main connecting rod 53 on the connecting rod pin 59 side, the mass of the connecting rod pin 59, and the mass of the part of the sub connecting rod 54 near the connecting rod pin 59; the inertial exciting force F4 due to a mass Msp of the swing pin part obtained by adding the mass of the swing pin 60, the mass of the part of the sub connecting rod 54 near the swing pin 60, and the mass of a part of the swing rod 55 on the swing pin 60 side; and the inertial exciting force F5 due to a mass Mpv of the eccentric shaft part obtained by adding the mass of the eccentric shaft 50 and the mass of a part of the swing rod 55 on the eccentric shaft 50 side. Accordingly, a total inertial exciting force F of the entire engine obtained by adding the inertial exciting forces F1 to F5 acts on the crankshaft 17 in a direction extending in a linear manner from the rotation axis of the crankshaft 17 shown in FIG. 3.

The total inertial exciting force F changes according to the actual rotation angle, that is, the actual crank angle, of the crankshaft 17 as shown by a dotted line in FIG. 4. When the actual crank angle is 180°, that is, when the piston 52 reaches the bottom dead center, which is the end of the expansion stroke, the total inertial exciting force F becomes the maximum. FIG. 3 shows a state in which the total inertial exciting force F is the maximum.

In the conventional reciprocating engine, the counterweights 17a and 17b are generally provided so that in a projection view on a plane orthogonal to the rotation axis of the crankshaft 17, centers of gravity of the counterweights are located on the opposite side of the rotation axis of the crankshaft 17 from the crank pin 17c and on a first straight line L1 connecting the rotation axis of the crankshaft 17 and the axis of the crank pin 17c. However, in the link type variable stroke engine, the inertial exciting forces F1 to F5 occur respectively in the movable components of the linking mechanism 51 as described above. Accordingly, the inertial exciting force unique to the link type variable stroke engine cannot be effectively reduced with the configuration in which the counterweights 17a and 17b are provided so that centers of gravity of the counterweights are located on the first straight line L1. According to the present invention, the counterweights 17a and 17b are provided so that in a projection view on a plane orthogonal to the rotation axis of the crankshaft 17, the centers of gravity G of the counterweights are located on a second straight line L2, which is different from the first straight line L1.

In other words, in the link type variable stroke engine according to the present invention, the counterweights 17a and 17b are provided so that in a projection view on a plane orthogonal to the rotation axis of the crankshaft 17, the centers of gravity G of the counterweights are located on the second straight line L2 extending from the rotation axis of the crankshaft 17 in the direction opposite to that of the maximum total inertial exciting force F.

Next, the operation of this embodiment will be described. The counterweights 17a and 17b are provided on the crankshaft 17 so that in a projection view on a plane orthogonal to the rotation axis of the crankshaft 17, centers of gravity G of the counterweights are located on the second straight line L2 extending from the rotation axis of the crankshaft 17 in the direction opposite to a direction of the total inertial exciting force F when the total inertial exciting force becomes maximum, the total inertial exciting force F obtained by adding the inertial exciting forces F1 to F5 occurring respectively in the movable parts of the linking mechanism 51. Accordingly, the centrifugal force occurring at the centers of gravity G of the counterweights 17a and 17b acts in such a direction that the total inertial exciting force F occurring with movement of each of the movable components of the linking mechanism 51 would be reduced. Thereby, the total inertial exciting force F can be suppressed and lessened effectively as indicated by a solid line in FIG. 4, consequently reducing vibration and also preventing noise attributable to vibration and a reduction in the strength of each component of the engine.

An embodiment of the present invention is explained above, but the present invention is not limited to the above-mentioned embodiment and may be modified in a variety of ways as long as the modifications do not depart from its gist.

The invention claimed is:

1. A link type variable stroke engine, comprising: an engine main body including a crankcase, a crankshaft is rotatably supported by said crankcase, and a rotary shaft is rotatably supported by said crank case such that power reduced at a speed reduction ratio of ½ from the crankshaft is transmitted thereto, the rotary shaft having an axis parallel to the crankshaft and including an eccentric shaft at an eccentric position, a piston slidably fitted to a cylinder block of the engine main body, and a linking mechanism linking the crankshaft and the eccentric shaft, the linking mechanism including: a main connecting rod which is coupled to the piston at a first end of the main connecting rod by a piston pin; a sub connecting rod which is rotatably coupled to the crankshaft by a crank pin, and which is rotatably coupled to a second end of the main connecting rod by a connecting rod pin; and a swing rod which is rotatably coupled to the sub connecting rod at a first end of the swing rod by a swing pin, at a position displaced from the position where said sub connecting rod is coupled to the main connecting rod, and which is rotatably coupled to the eccentric shaft at a second end of the swing rod, wherein counterweights are provided on the crankshaft such that, in a projection view on a plane orthogonal to a rotation axis of the crankshaft, centers of gravity of the counterweights are located on a straight line extending from the rotation axis of the crankshaft in an opposite direction to a direction of a total inertial exciting force when the total inertial exciting force is maximized, and wherein the total inertial exciting force is obtained by adding inertial exciting forces occurring respectively in moveable components of the linking mechanism.

* * * * *